United States Patent [19]

Fagerstrom et al.

[11] 3,908,533
[45] Sept. 30, 1975

[54] APPARATUS FOR CONTINUOUSLY COOKING FOOD IN SEQUENTIAL OVEN SECTION OF AN ELONGATED OVEN

[75] Inventors: Kurt Gunnar Fagerstrom; Bertil Henry Goransson, both of Alingsas; Per-Olov Hellstrom, Malmo, all of Sweden

[73] Assignee: Aktiebolaget Electrolux, Stockholm, Sweden

[22] Filed: Apr. 4, 1973

[21] Appl. No.: 347,691

[52] U.S. Cl. ............................. 99/386; 99/443 C
[51] Int. Cl. ......................... A47j 37/08; A23l 3/00
[58] Field of Search ........... 99/447, 443, 423, 420, 99/404, 401, 386, 374, 373, 367, 362

[56] References Cited
UNITED STATES PATENTS

| | | | |
|---|---|---|---|
| 1,411,641 | 4/1922 | Mininberg | 99/362 |
| 3,019,744 | 2/1962 | Carvel | 99/443 C |
| 3,125,017 | 3/1964 | Tauber | 99/443 C |
| 3,528,362 | 9/1970 | Arnold | 99/386 |
| 3,721,178 | 3/1973 | Szabrak | 99/386 |
| 3,802,832 | 4/1974 | Nicolaus | 99/443 C |

*Primary Examiner*—Harvey C. Hornsby
*Assistant Examiner*—Robert T. Pous
*Attorney, Agent, or Firm*—Alfred E. Miller

[57] ABSTRACT

An apparatus and method of continuously cooking various food products which are transported through an elongated oven. The latter is constituted of a series of sequential oven sections in which each has a separate system for circulating a hot gaseous medium at high velocity in a direction transverse to the path of movement of the food products through the oven. Each system has individual means for adjustment and control of the temperature therein.

7 Claims, 7 Drawing Figures

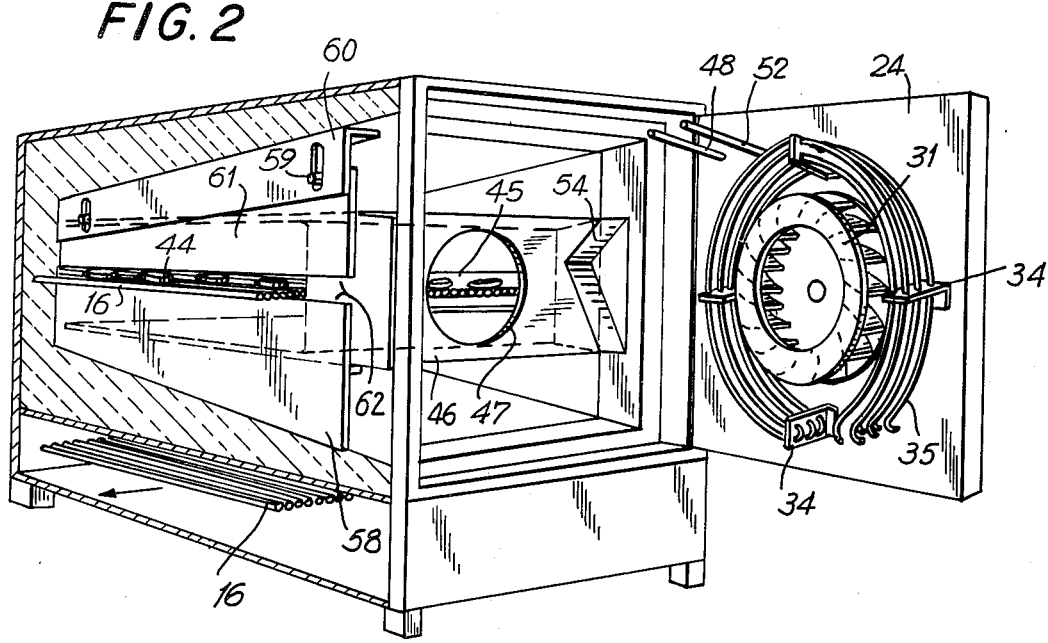
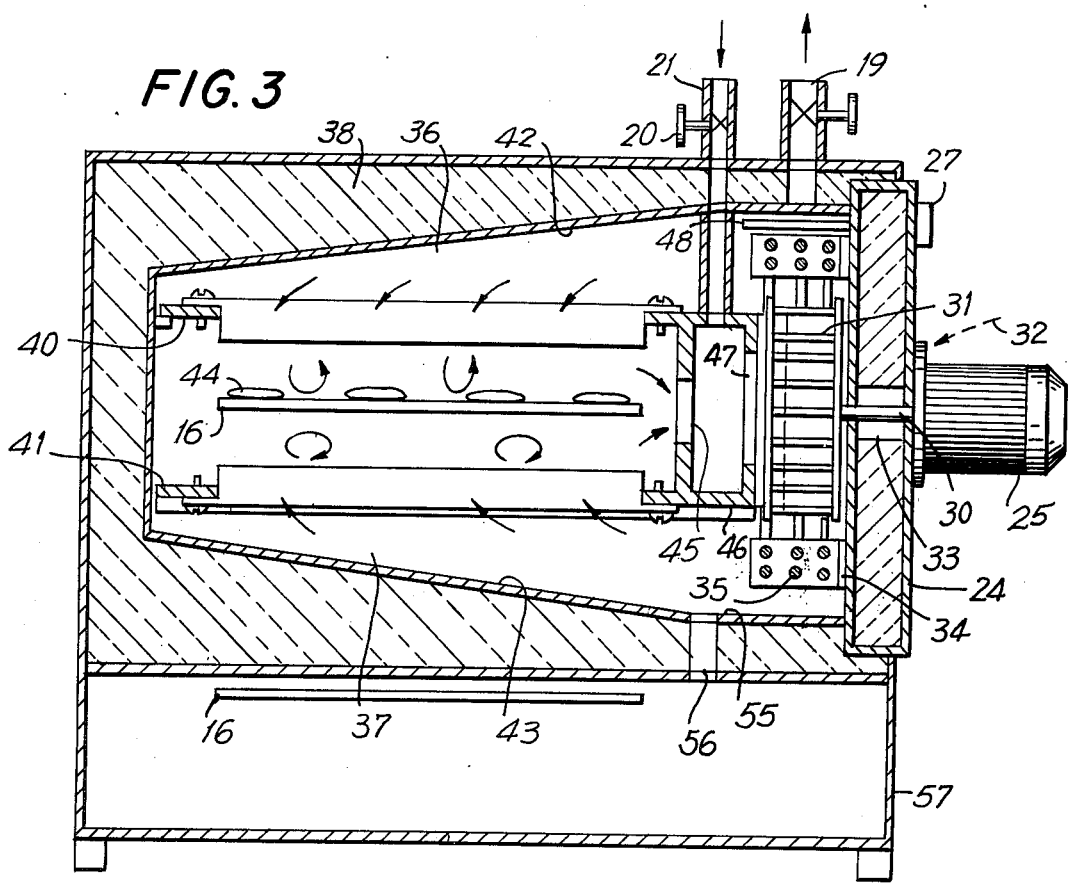

APPARATUS FOR CONTINUOUSLY COOKING FOOD IN SEQUENTIAL OVEN SECTION OF AN ELONGATED OVEN

In recent years, there has been a change in the technique of food cooking with the advent of food products that are semi-prepared, or are ready-made and only require heating. The use of this food cooking technique is particularly useful in the mass preparation of food for schools, hospitals, and large restaurants. Thus, food cooking with primary food ingredients as a base is continually changing to food cooking using the aforesaid semi-prepared or ready-made food products.

The above-described change in food cooking technique involves problems, especially when frying foods. In industrial cooking, grilling of the food products as well as cooking in oil is being utilized to an increased extent. However, serious drawbacks have arisen with the continuously operating cooking machines that are presently on the market. For example, one type of known cooking machine is provided with a conveyor belt on which foodstuffs, for instance in the form of meat balls or fish filets, are transported through a heated oil bath. It appears from the standpoint of nutritional physiology and food hygienics that the food becomes impregnated with saturated fatty acids which, of course, is undesirable. Furthermore, from the standpoint of food economics, the prior art method involves considerable waste and a substantial loss of weight. Moreover, the product changes in shape and shrinks during processing. In addition, the heating oil in the bath is consumed and charred food remainders collect in the bath receptacle.

A further disadvantage of the prior art constructions is that it is necessary to substitute the heating oil bath when changing from processing fish to the processing of meat; otherwise, the flavoring substances would be transmitted from one food product to another food product. Another disadvantage of known mass cooking arrangements is that the food products do not stay on the belt but move about in the oil during the passage through the oil bath. Consequently, at least some of the food products do not come out of the bath in the same order that they were introduced into the bath. Thus, the time of processing of each individual food piece will not be exactly the same. Since the cooking time for each food piece is not uniform the further packing or freezing of the food products is affected in a deleterious manner.

The present invention overcomes the disadvantages and drawbacks of the prior art food cooking machines.

It is an object of the present invention to provide an apparatus and method for food cooking processing in which the food products are transported on a conveyor through an elongated oven having sequential and individually operable heating zones.

It is a further object of the present invention to provide heating zones which are each individually operable oven sections in which heat is supplied by convection of air circulated at high velocity in circulation paths located substantially transverse to the direction of the transport of the food products through the oven.

Another object of the present invention is to provide individually operable oven sections in which the air temperature is set and controlled separately in each separate path of circulation.

An object of the present invention is to provide a continuous cooking, particularly a frying process, which is a high capacity machine for all types of food products. The present machine is so constructed and operated that the food product being cooked does not change its form and loses only an insignificant amount of weight.

Another object of the present invention is to provide a food cooking machine that can be easily and effectively combined with other automatic machines for the preparation of foodstuffs, such as meat-forming machines, packing machines, and food freezing units.

The invention will now be more fully described with reference to the accompanying drawings in which:

FIG. 2 is an enlarged perspective view of an individual cooking zone or oven part, being partly in section;

FIG. 3 is a vertical section through an individual cooking zone shown in FIG. 2, however, with the door in a closed position;

PREFERRED EMBODIMENT OF THE INVENTION

Figure 1:
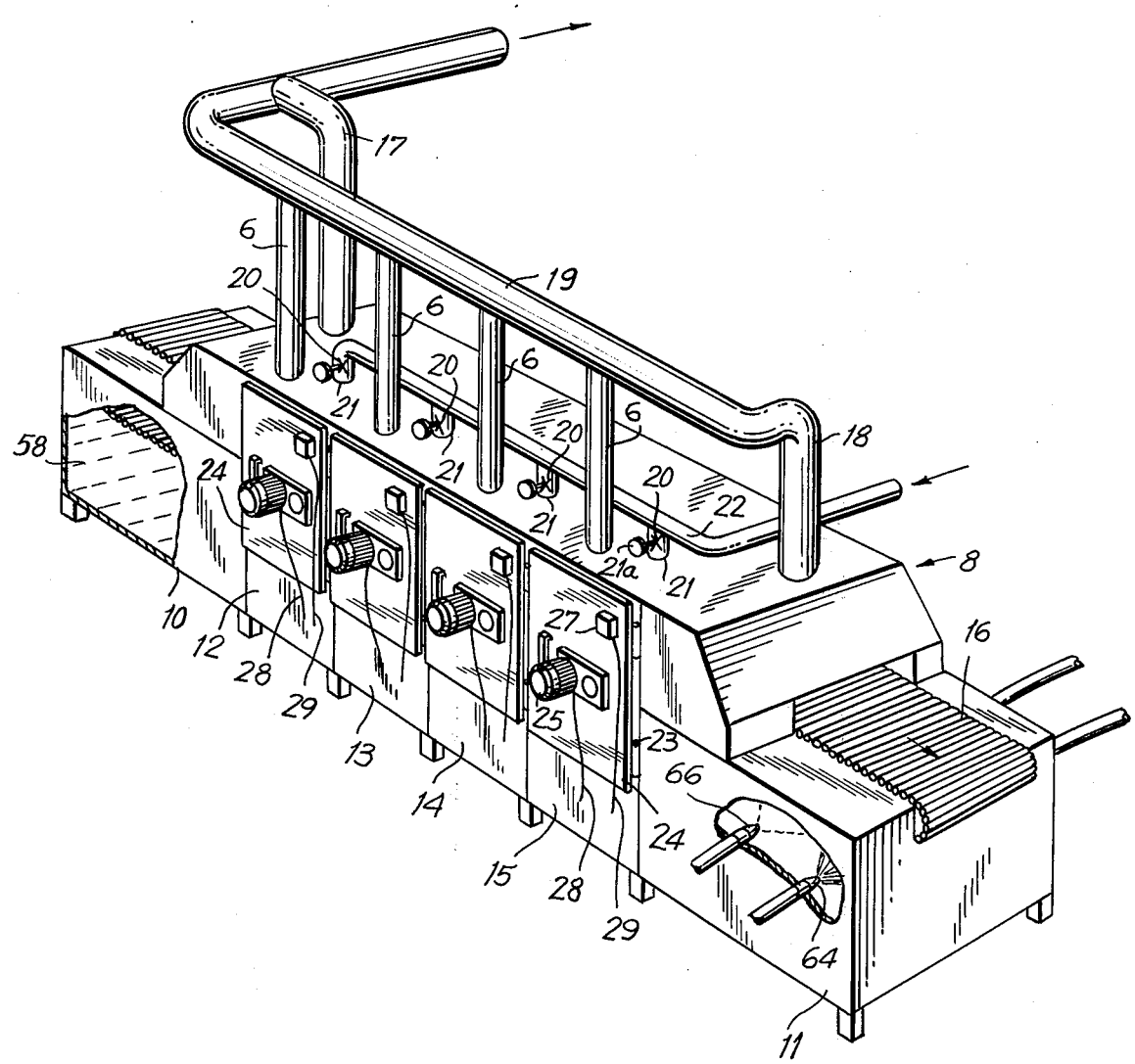
FIG. 1 is a perspective view of the elongated oven with sequential and individually operable cooking zones constructed in accordance with the teachings of our invention.

As seen in FIG. 1, an elongated oven referred to generally by the numeral 8, is provided with an inlet portion 10 and a discharge portion 11. Four oven sections or heating zones 12, 13, 14, and 15 are shown, located between the inlet portion 10 and the discharge portion 11. A conveyor belt 16 passes through the entire oven 8. The inlet and discharge portions 10 and 11 are provided with venting conduits 17, 18, and 19, while oven sections 12, 13, 14, and 15 have vertical pipes 6 that are also connected to conduit 19. Each of the conduits 6, 17, 18, and 19 is provided with valves (not shown). Moreover, the oven sections 12, 13, 14, and 15 are connected to a common gas or vapor supply 22 by means of branch conduits 21, each of which is provided with a control valve 20. The oven sections are each further provided with a door 24 supported on hinges 23. A fan motor 25 is mounted externally on the door 24 and adjacent thereto is an adjustable air intake 26. Located on the upper exterior part of each door 24 is a housing 27 for a thermometer and a temperature sensing member of a thermostat (not shown). The fan motor 25 and the thermostat are connected by wires 28 and 29 to the oven control center (not shown). Of course, the sensing member of the thermostat must be positioned within the oven while the control means and indicator for the thermostat may be located in the oven control center.

As seen in FIG. 3, the fan motor 25 mounted on the exterior of the door 24 operates a fan wheel 31 in the interior of the oven through a shaft 30. Atmospheric air is drawn through the air intake 26 from the outside of the door 24, as indicated by the arrow 32 in FIG. 3, and is led through a channel 33 surrounding the shaft 30 in order to cool the same. Mounted on the inside of the door 24, is an electrical heating device having a plurality of tubular elements 35 supported by angle brackets 34. As seen in FIG. 2, the tubular elements are disposed in a ring about the fan wheel 31. It will be noted that air is drawn centrally into the fan wheel 31 and while being heated is projected radially in all directions within the particular oven section. The air is then led into the oven space proper through an upper and a lower air channel 36 and 37, respectively, and flows in a turbulent manner as indicated by the arrows. The oven space is surrounded by heat insulation material 38 and the air flow pattern is in a direction substantially transverse to the path of movement of the conveyor belt 16. The sides of the channels 36 and 37 facing the conveyor belt 16 are defined by frames 40 and 41 having adjustable guide plates 49 and 50. The plates are disposed parallel to the conveyor belt 16 and are provided with slits 39 that are regulated by changing the relationship of the guide plates 49 and 50.

In the upper part of each oven section, the channel 36 defines an inner wall part 42 which is inclined downwardly toward the rear of the oven so that the cross-sectional area of the channel 36 decreases in the direction of air flow. In the lower part of each oven section, the channel 37 defines an inner wall 43 that is inclined upwardly so that this channel, too, has a decreasing area in cross section toward the back of the oven section and in the direction of air flow.

The heated gaseous medium in the oven section is blown by the fan wheel 31 through the channels 36 and 37 at such a velocity that after having passed through the slits 39, it is blown upon the food products 44 on the conveyor belt 16 with considerable amount of turbulence from both the upper and lower channels 36 and 37, respectively. It should be noted that the angles of inclination of the oven inner walls 42 and 43 are such that the reduced flow area corresponds to the reduced quantity of the gaseous medium. Thus, a uniform vertical flow velocity is provided along the entire length of slits 39. The conveyor belt 16 is so constructed that the turbulent gaseous medium comes into contact with the food products on the underside of the belt as well as from the top side of the belt and the necessary heat is supplied to the food products in the oven by convection. Thus, a very uniform heat supply is achieved for the food products being cooked over the entire length of the conveyor belt 16.

Secured to the frames 40 and 41 and positioned adjacent to the fan wheel 31 is a box-like structure 46 having a slit 45 in one side facing the conveyor belt 16 and an aligned central circular opening 47 in the other side of structure 46. The somewhat cooled gaseous medium in the space surrounding the conveyor belt is drawn through the slit 45, which is located parallel to the length of the belt 16, and then through the circular opening 47 to the suction side of the fan wheel 31. In the front of the box-like structure 46 are formed triangular guide plates 53 and 54 which guide the gaseous medium from the fan wheel 31 to both the upper and lower channels 36 and 37, respectively, when the door 24 is closed and the fan wheel 31 and tubular elements 35 are moved adjacent to the opening 47 and between the guide plates 53 and 54.

As seen in FIG. 3, a sensor 48 for a regulating device 52 is positioned in the air circulation path in channel 36 and is adapted to regulate the supply of heat through the tubular elements 35. The velocity and quantity of the gaseous medium in the air circulation path may be controlled by means of throttling the slit 45. Furthermore, the openings of the slits 39 can be regulated by adjusting the movable guide plates 49 and 50 which can be locked in different selected positions in the frame 40 and 41, respectively, by means of screws 51. Suitable quantities of a gaseous medium or a vapor may be introduced into the box-like structure 46 adjacent to the fan wheel 41 through the conduit 20, and selected quantities of the gaseous medium or vapor may be expelled from the system through vent conduit 19.

Figure 4:
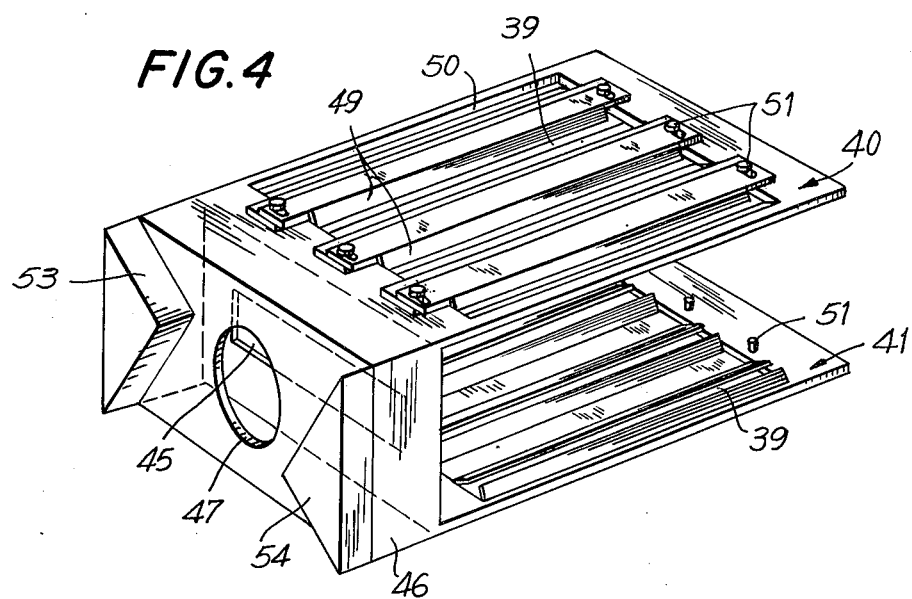
FIG. 4 is a perspective view of an oven insert in a cooking zone.

It should be apparent from FIGS. 2 and 4 that the oven elements are easy to clean. Referring to FIG. 2, it will be noted that when the door 24 is opened, the heating tubular elements 35 and the fan wheel 31 which are mounted on the back of the door are completely exposed together with the sensor 48 of the temperature regulator 52 and of the thermometer. The frames 40 and 41 and the box-like structure 46 guiding the air flow form a removable oven insert as illustrated in FIG. 4. When the aforesaid structure is removed from the oven 8, only the conveyor belt 16 remains in the oven. As seen in FIG. 3, detergent and rinsing water used to clean the interior of the oven will automatically flow to the lowest point 55 in the oven. This point communicates by a discharge conduit 56 with a collecting receptacle or an outlet located under the oven in the oven support 57.

A plurality of nozzles 64 for high pressure washing of the endless conveyor belt 16 are located in the lower part of the discharge portion 11 of the oven 8. In addition, compressed air nozzles 66 are shown for drying the belt. Moreover, in order to prevent food products which are transported to the intake end of the belt 16 from being burned and adhering to the hot belt, a water bath 58 is provided at the lower part of the intake portion 10 of the oven 8 so that the portions of the belt 16 which continuously arrive at the intake 10 of the oven are continuously cooled.

Although, as set forth above, means are provided for cleaning the oven 8, the use of convection heat and the particular oven design results in a relatively clean oven after use which often does not require cleaning. In addition, because there is very little residue buildup, the risk of fire due to collected residue as well as inflammable oils is generally eliminated. Furthermore, the oven is so constructed that different kinds of food products may be cooked with only an adjustment being required by the oven control of the quantity of heating and gaseous medium or air velocity in the oven sections 12, 13, 14, and 15 which is suitable for the food products being processed. In addition, the speed of the conveyor belt 16 may be changed for the particular products thereon.

For example, if it is desired to process meat balls, the fan wheels 31 in the four oven sections or parts 12, 13, 14, and 15 may be set for a suitable air velocity and the control members for temperatures of about 200°C, 250°–300°C, 300°–350°C, and 400°C. The conveyor belt 16 drive is started and the belt moves at about one meter per minute. Thus, the elapsed time for each food product to pass through the oven 8 will be about six minutes and the processing time about four minutes. The processing capacity for the food products depends upon the amount of formed raw meat balls that can be loaded on the conveyor belt 16 at the intake end 10 of the oven.

It should be noted that it is not measurably increase the speed of the belt 16 and the temperatures in the oven in order to process more food products per unit of time. However, it is possible to increase production by making the conveyor belt longer and to add oven sections. Then the speed of the conveyor can be increased so that each kind of food product is subjected generally to the same combination of time and temperature as in the case described hereinabove. If it is desired to change to processing food products having substantially the same heat capacity and properties as the products presently being processed, the air velocity may be regulated to some extent in order to achieve satisfactory results. On the other hand, if it is desired to change to processing food products of very different heat capacity, such as cooking chickens, it is necessary to reduce the speed of the conveyor belt 16 and the oven temperature should be maintained at about 250°C.

The present oven unit design can be modified within the spirit and scope of the invention for different processing capacities. For example, an oven unit of the type as described above, but having ten oven sections and a conveyor belt width of one meter is calculated to have a capacity of about 30,000 meat balls per hour. Accordingly, if it is desired to have a larger processing capacity, the oven unit should initially have more than four oven sections, as described hereinabove. This may be especially suitable when it is desired to affect the course of processing by supplying a vapor during some sequence in the food treatment. This can be accomplished in any one of the oven sections and the intermediate part may be more or less employed to remove moist atmosphere from the oven space. The above procedure may depend upon whether or not it is desired to boil and fry or grill the food products in several different steps.

Figure 5:
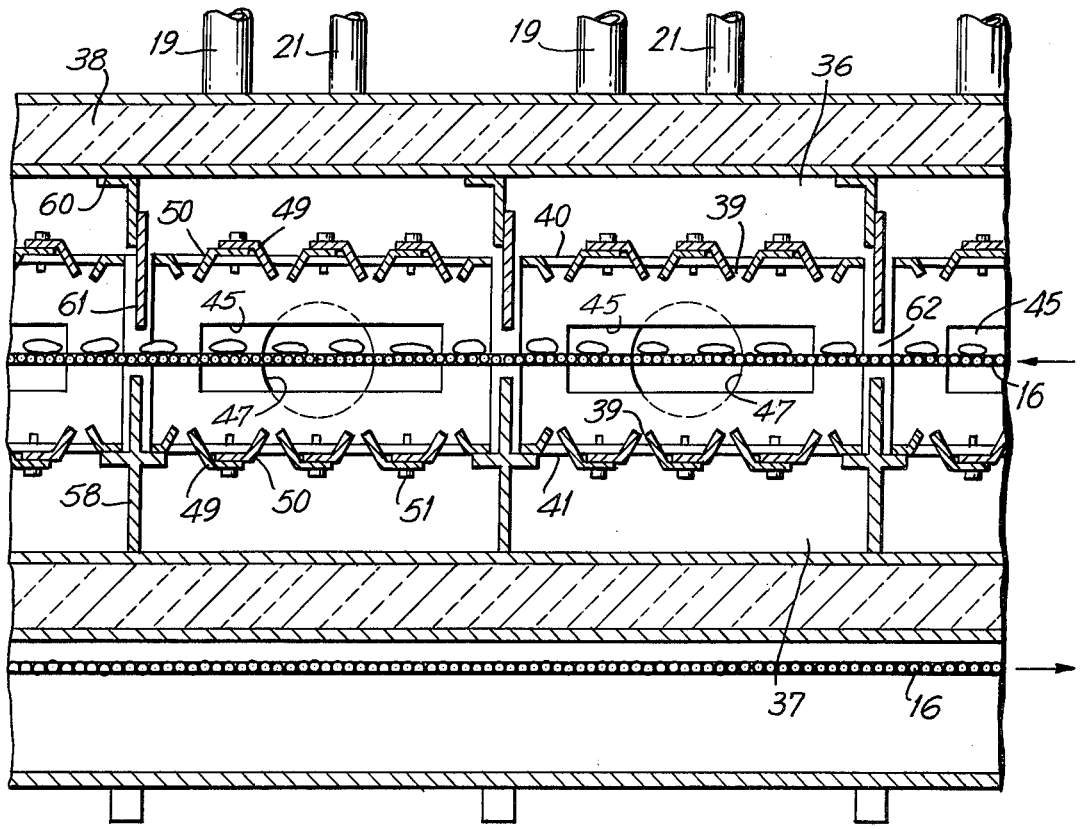
FIG. 5 is an enlarged longitudinal sectional view of a portion of the elongated oven.

Referring now especially to FIGS. 2 and 5, a structure is shown for maintaining different temperatures as mentioned hereinabove in which each of the oven sections 12, 13, 14, and 15 has a lower side plate 58 positioned under the conveyor belt 16 inside the oven space. A shield plate 61 is shown being adjustable by screws 59 located in elongated slots in the angle iron 60 and located above the conveyor belt 16. The shield plate 61 is adjustable to such a height that the belt 16 with food products 44 thereon can just pass without too large amounts of air or gaseous medium passing the same way. The size of the opening 62 between the plates 58 and 61 should be changed considerably if the food processing changes from processing meat balls to frying chickens and vice versa. It should be apparent that it is not necessary to adjust the opening 62 to be very narrow, since the oven operates in such a manner that incoming and outgoing gaseous medium generally balance each other.

It should be particularly noted that the present oven unit can be easily combined with other automatic machinery for the preparation of food products. For example, the present oven unit can be directly combined with automatic machines to form minced meat, meat balls, for spraying food coloring and grilling oil. Furthermore, food packaging machines or freezing units can be directly connected to the discharge portion 11 of the machine, and the food products can pass automatically from the oven to the automatic machinery.

Figure 6:
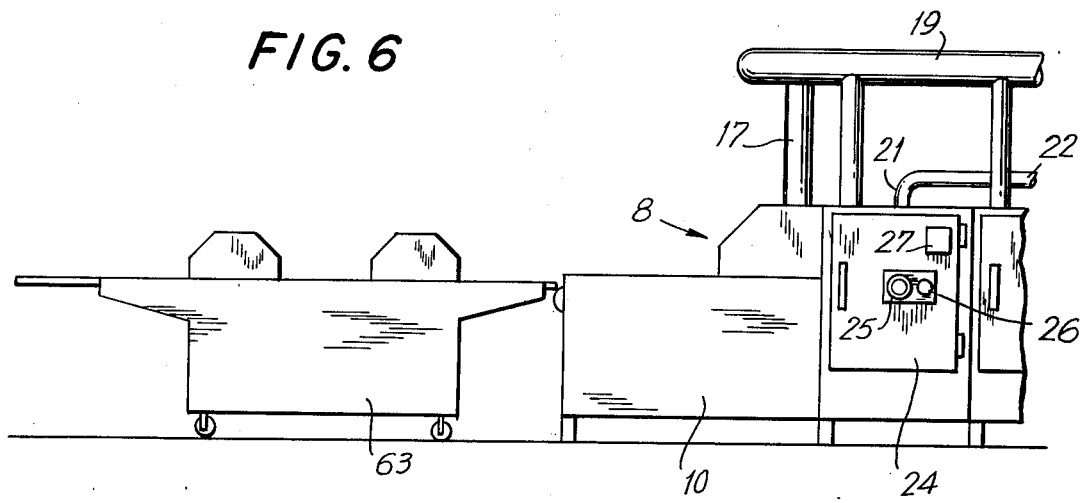
FIG. 6 is a partial side elevation view of the forward part of the elongated oven having an automatic spraying apparatus operatively connected to the forward end of the oven.
Figure 7:
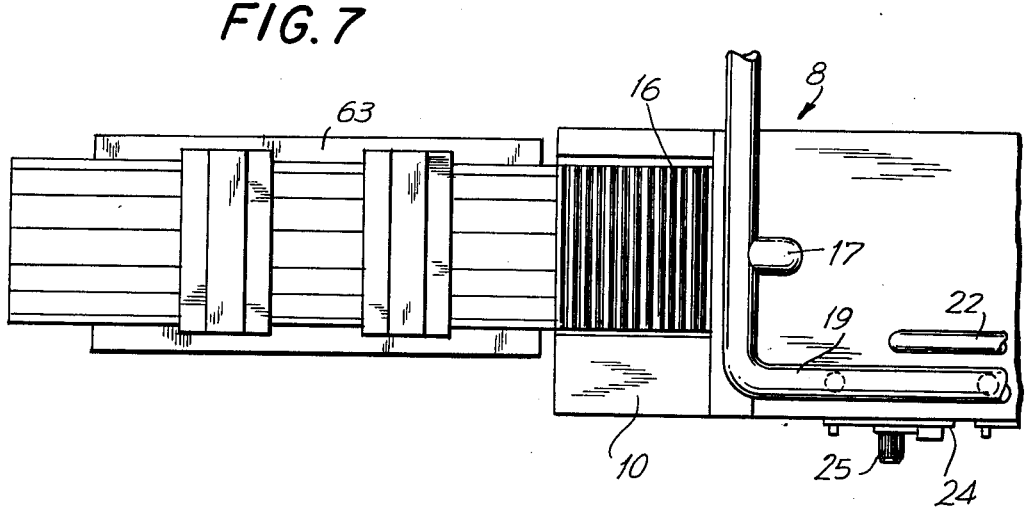
FIG. 7 is a top plan view of the structure shown in FIG. 6.

As seen in FIGS. 6 and 7, an automatic spraying machine 63 is illustrated being located forward of the automatic oven unit 8. The food products to be processed are passed through a mist of fat which forms a thin film around them and this film will protect the surface of the product when passing from the cold zone to the warm zone in the oven unit which is utilized for frying. The film is removed by being consumed in the oven atmosphere.

In summary, it should be pointed out that the present invention relates to an apparatus and method in which an oven for cooking is provided with an intake portion, a discharge portion, and oven sections which are arranged between the intake and discharge portions with an endless conveyor passing through the oven. Each oven section is provided with a separate system for circulating a gaseous medium such as hot air at a high velocity in a direction transverse to the path of movement of the conveyor. Each oven section also has means for adjustment and control of the temperature.

The present apparatus is especially desirable for providing a continuous frying process at high capacity for all type of products, which process involves operating at unusually high temperatures and very great air velocity. This particular mode of operation results in only an insignificant loss of product weight and a product which does not change its form. The food items are processed into a flavorous finished food product which can be stored for a longer period of time than heretofore.

What is claimed is:

1. Apparatus for continuously cooking foods in a sequential arrangement comprising an elongated oven having a plurality of oven sections arranged in tandem, a conveying means for transporting the foods sequentially through each of the oven sections, a gaseous medium in each oven section, fan and heating members in each oven section for circulating said gaseous medium over the foods on the conveying means in circulation paths that are substantially transverse to the path of movement of said conveying means, first guide members in the circulation paths for causing said heated gas to flow over the foods on the conveying means in two separate paths in which one path is above the conveying means and the other path is below said conveying means, each of said oven sections being provided with an oven insert having second guide members, said second guide member causing a turbulent flow of gas above and below said conveying means, said oven insert being further provided with a box-like structure positioned adjacent to the conveying means and having a long slit extending substantially parallel to the plane of the conveying means and forming an inlet opening for the circulating gas, and an opening in said box-like structure aligned with said slit forming an outlet for the gas and communicating with the inlet of the fan.

2. Apparatus for continuously cooking foods in a sequential arrangement comprising an elongated oven having a plurality of oven sections arranged in tandem, a conveying means for transporting the foods sequentially through each of the oven sections, means for circulating air supplied to the apparatus from the atmosphere, such means being a fan wheel in each oven section for circulating said air at high velocity over the foods on the conveying means in paths that are substantially transverse to the path of movement of said conveying means, heating means in each oven section adjacent to said fan wheel, drive means for said fan wheel, means for conveying said atmospheric air to a center region of said fan wheel whereupon said air is projected radially into contact with said heating means and into two separate paths, one of said paths being above the conveying means and the other of said paths being below said conveying means, and guide members provided with adjustable elements for causing said heated air to flow over and to form a turbulence upon the foods on the conveying means.

3. Apparatus for continuously cooking foods in a sequential arrangement comprising an elongated oven having a plurality of oven sections arranged in tandem, conveying means for transporting the foods sequentially through each of the oven sections, means for circulating air drawn in from the atmosphere, such means being a fan wheel in each oven section for circulating said air at high velocity in paths over and under the foods on the conveying means and to accomplish the heat transfer by convection, the flow paths being substantially transverse to the path of movement of said conveying means, heating means in each oven section adjacent to said fan wheel, drive means for said fan wheel, an oven insert having adjustable guide members for each of the oven sections, said oven insert being removable as a unit from its respective oven section, means for conducting said air drawn in from the atmosphere to said fan wheel whereby the air is projected radially into contact with said heating means into one path above and another path below said conveying means, and each of said oven sections being so shaped to provide a gradually reduced flow area rearwardly thereby providing a uniform flow velocity along the oven insert.

4. Apparatus as claimed in claim 2, wherein each of said oven sections is provided with a door, said fan wheel being mounted on the inside of said door and surrounded by said heating means.

5. Apparatus as claimed in claim 3, wherein the shape of each oven section constitutes sloped opposite walls which define air flow paths that gradually diminish in cross section.

6. Apparatus as claimed in claim 2 further provided with an outlet for the air drawn in from the atmosphere utilized in the circulation paths, said outlet having a valve.

7. Apparatus as claimed in claim 2 further comprising means for setting and controlling the air temperature in each of said oven sections.

* * * * *